US012340750B2

(12) United States Patent
Zhou et al.

(10) Patent No.: US 12,340,750 B2
(45) Date of Patent: Jun. 24, 2025

(54) PIXEL DRIVE CIRCUIT AND DISPLAY PANEL

(71) Applicant: HKC CORPORATION LIMITED, Shenzhen (CN)

(72) Inventors: Renjie Zhou, Guangdong (CN); Rongrong Li, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/090,585

(22) Filed: Dec. 29, 2022

(65) Prior Publication Data

US 2024/0038174 A1 Feb. 1, 2024

(30) Foreign Application Priority Data

Jul. 28, 2022 (CN) ......................... 202210898918.7

(51) Int. Cl.
*G09G 3/3258* (2016.01)

(52) U.S. Cl.
CPC ... *G09G 3/3258* (2013.01); *G09G 2300/0408* (2013.01); *G09G 2300/0819* (2013.01);
(Continued)

(58) Field of Classification Search
CPC ......... G09G 3/3258; G09G 2300/0408; G09G 2300/0819; G09G 2300/0852;
(Continued)

(56) References Cited

U.S. PATENT DOCUMENTS

2011/0164071 A1 7/2011 Chung et al.
2013/0069852 A1* 3/2013 Liao ..................... G09G 3/3233 345/77

(Continued)

FOREIGN PATENT DOCUMENTS

CN 105096831 A 11/2015
CN 106504707 A 3/2017

(Continued)

OTHER PUBLICATIONS

CMOS Digital Integrated Circuits: Analysis and Design (Year: 2005) by Sung-Mo Kang, Yusuf Leblebici (third edition), p. 76.*

(Continued)

*Primary Examiner* — Roberto W Flores
(74) *Attorney, Agent, or Firm* — HAUPTMAN HAM, LLP

(57) ABSTRACT

A pixel drive circuit and a display panel are provided in the disclosure. The pixel drive circuit includes a drive transistor, an energy-storage capacitor, a bootstrap capacitor, a pre-charge loop, a data-writing loop, and a light-emitting loop. The energy-storage capacitor has a first terminal coupled with a control terminal of the drive transistor. The bootstrap capacitor has a first terminal coupled with a first coupling terminal of the drive transistor. The pixel drive circuit is configured to charge a voltage at the first terminal of the bootstrap capacitor to reach a value of a drive voltage via the pre-charge loop in a reset phase, and receive a data voltage via the bootstrap capacitor to charge the energy-storage capacitor based on a bootstrap effect of the bootstrap capacitor in a data-writing phase.

16 Claims, 7 Drawing Sheets

100

(52) U.S. Cl.
CPC ............... *G09G 2300/0852* (2013.01); *G09G 2310/0248* (2013.01); *G09G 2310/0262* (2013.01); *G09G 2310/08* (2013.01); *G09G 2320/0233* (2013.01)

(58) Field of Classification Search
CPC ... G09G 2310/0248; G09G 2310/0262; G09G 2310/08; G09G 2320/0233; G09G 3/30–3291
See application file for complete search history.

(56) References Cited

U.S. PATENT DOCUMENTS

| | | | | |
|---|---|---|---|---|
| 2016/0148571 | A1 | 5/2016 | Cho et al. | |
| 2017/0301283 | A1* | 10/2017 | Liu | G09G 3/32 |
| 2020/0111420 | A1* | 4/2020 | Yang | G09G 3/3258 |
| 2021/0027702 | A1* | 1/2021 | Park | G09G 3/325 |
| 2021/0256908 | A1* | 8/2021 | Park | G09G 3/3275 |
| 2021/0327988 | A1* | 10/2021 | Park | H10K 59/131 |
| 2022/0028333 | A1* | 1/2022 | Jeong | G09G 3/3275 |
| 2022/0102463 | A1* | 3/2022 | Park | G09G 3/3233 |
| 2022/0130335 | A1 | 4/2022 | Liu et al. | |
| 2022/0310016 | A1* | 9/2022 | Yang | G09G 3/3266 |
| 2022/0392985 | A1* | 12/2022 | Song | G09G 3/035 |

FOREIGN PATENT DOCUMENTS

| | | | |
|---|---|---|---|
| CN | 106710528 | A | 5/2017 |
| CN | 107025883 | A | 8/2017 |
| CN | 107221289 | A | 9/2017 |
| CN | 110176214 | A | 8/2019 |
| CN | 112908258 | A | 6/2021 |
| CN | 113971932 | A | 1/2022 |
| CN | 113990239 | A | 1/2022 |
| CN | 114038367 | A | 2/2022 |
| EP | 4113499 | A1 | 1/2023 |
| JP | 2006091923 | A | 4/2006 |
| JP | 2008039893 | A | 2/2008 |
| JP | 2011221165 | A | 11/2011 |
| JP | 2019066517 | A | 4/2019 |
| KR | 20210128560 | A | 10/2021 |

OTHER PUBLICATIONS

WIPO, International Search Report and Written Opinion for International Application No. PCT/CN2022/141297, Mar. 29, 2023.
The extended European search report issued in corresponding EP application No. 22925233.3, dated Feb. 23, 2024.
Notice of reasons for refusal issued in corresponding JP application No. 2023-566837 dated Oct. 11, 2024.
Notice of Preliminary Rejection issued in corresponding KR application No. 10-2023-7031780 dated Jun. 30, 2024.
Notice of allowance issued in corresponding CN application No. 202210898918.7 dated Jun. 28, 2024.

* cited by examiner

PIXEL DRIVE CIRCUIT AND DISPLAY PANEL

CROSS-REFERENCE TO RELATED APPLICATIONS

This application claims priority under 35 U.S.C. § 119(a) to Chinese Patent Application No. 202210898918.7, filed Jul. 28, 2022, the entire disclosure of which is incorporated herein by reference.

TECHNICAL FIELD

This disclosure relates to the field of display technology, and in particular, to a pixel drive circuit and a display panel.

BACKGROUND

Organic Light-Emitting Diode (OLED) displays have found increasingly wide utilization because of their advantages such as low power consumption, fast response speed, and wide viewing angle.

In an OLED array of the OLED display, each OLED has a corresponding pixel drive circuit, and the pixel drive circuit generally includes multiple Thin Film Transistors (TFTs). However, there are differences among parameters of TFTs of different pixel drive circuits, such as a threshold voltage Vth (i.e., a gate-source bias voltage that makes the TFT in a critical cut-off/conduction state) or a migration rate. As such, differences among brightness of lights emitted by different OLEDs will be resulted and thus perceived by human eyes, which is known as a Mura phenomenon that may decrease a display performance of a display device.

In the related art, in order to avoid uneven display brightness due to different threshold voltages of TFTs of different pixel drive circuits, it is usually to design pixel drive circuits with compensation functions such as Six-Transistors-One-Capacitor (6T1C), Seven-Transistors-One-Capacitor (7T1C), or Eight-Transistors-One-Capacitor (8T1C), and make the pixel drive circuit operate sequentially in a reset phase, a data-writing phase, and a light-emitting phase. An existing pixel drive circuit compensates the threshold voltage Vth of the TFT in the data-writing phase, so that display brightness of an OLED has correlation with the data voltage Vdata and the drive voltage VDD but has no correlation with the threshold voltage Vth of the TFT. However, a power-supply line for transmission of a drive voltage VDD has an impedance that may make pixel drive circuits at different distances from a power-supply chip receive different drive voltages VDD, thereby resulting in display brightness differences among OLEDs at different distances from the power-supply chip, and thus the Mura phenomenon cannot be completely eliminated, and the larger the OLED display, the more obvious the Mura phenomenon, seriously affecting a visual experience of a user.

SUMMARY

A pixel drive circuit is provided in the disclosure. The pixel drive circuit is configured to drive a light-emitting element to emit lights. The light-emitting element has a first terminal configured to receive a reference voltage. The pixel drive circuit is operated sequentially in a reset phase, a data-writing phase, and a light-emitting phase within a one-frame display period. The pixel drive circuit includes a drive transistor, an energy-storage capacitor, an energy-storage-capacitor reset loop, a bootstrap capacitor, a pre-charge loop, a data-writing loop, and a light-emitting loop. The drive transistor includes a control terminal, a first coupling terminal, and a second coupling terminal, where the first coupling terminal is configured to receive a drive voltage, and the second coupling terminal is electrically coupled with a second terminal of the light-emitting element. The energy-storage capacitor has a first terminal electrically coupled with the control terminal of the drive transistor and a second terminal configured to receive a first voltage with a constant voltage value. The energy-storage-capacitor reset loop is configured to receive a first reset-voltage to reset a voltage at the first terminal of the energy-storage capacitor to reach a value of the first reset-voltage when the energy-storage-capacitor reset loop is conducted in the reset phase. The bootstrap capacitor has a first terminal electrically coupled with the first coupling terminal of the drive transistor and a second terminal configured to receive a zero-potential voltage in the reset phase and receive a data voltage in the data-writing phase. The pre-charge loop is configured to receive the drive voltage to charge the bootstrap capacitor when the pre-charge loop is conducted in the reset phase, so that a voltage at the first terminal of the bootstrap capacitor is adjusted to reach a value of the drive voltage, a voltage at the second terminal of the bootstrap capacitor is reset to reach a value of the zero-potential voltage, and a difference between the voltage at the first terminal of the bootstrap capacitor and the voltage at the second terminal of the bootstrap capacitor reaches the value of the drive voltage. The data-writing loop includes the bootstrap capacitor, the drive transistor, and the energy-storage capacitor coupled in series. The data-writing loop is configured to receive the data voltage at the second terminal of the bootstrap capacitor to charge the energy-storage capacitor based on a bootstrap effect of the bootstrap capacitor when the data-writing loop is conducted in the data-writing phase, so that a voltage at the control terminal of the drive transistor is adjusted from the value of the first reset-voltage to a value of a second voltage. The drive transistor is in a critical conduction state when the voltage at the control terminal of the drive transistor is equal to the second voltage, and the second voltage is equal to a sum of the drive voltage, the data voltage, and a threshold voltage of the drive transistor. The light-emitting loop includes the drive transistor and the light-emitting element coupled in series. The first coupling terminal of the drive transistor is configured to receive the drive voltage to drive the light-emitting element to emit lights when the light-emitting loop is conducted in the light-emitting phase.

Optionally, the pre-charge loop includes a first switching transistor, the bootstrap capacitor, and a second switching transistor coupled in series. The first switching transistor has a first coupling terminal configured to receive the drive voltage and a second coupling terminal electrically coupled with the first terminal of the bootstrap capacitor. The second switching transistor has a first coupling terminal electrically coupled with a grounding terminal and configured to receive the zero-potential voltage and a second coupling terminal electrically coupled with the second terminal of the bootstrap capacitor. In the reset phase, the first switching transistor is configured to be conducted in response to a scan signal received at a control terminal of the first switching transistor, and the second switching transistor is configured to be conducted in response to a scan signal received at a control terminal of the second switching transistor, so that the pre-charge loop is conducted.

Optionally, the data-writing loop includes a third switching transistor, the bootstrap capacitor, the drive transistor, a fourth switching transistor, and the energy-storage capacitor coupled in series. The third switching transistor has a first coupling terminal configured to receive the data voltage and a second coupling terminal electrically coupled with the second terminal of the bootstrap capacitor. The fourth switching transistor is electrically coupled between the second coupling terminal of the drive transistor and the first terminal of the energy-storage capacitor. In the data-writing phase, the third switching transistor is configured to be conducted in response to a scan signal received at a control terminal of the third switching transistor, and the fourth switching transistor is configured to be conducted in response to a scan signal received at a control terminal of the fourth switching transistor, so that the data-writing loop is conducted.

Optionally, the light-emitting loop includes the first switching transistor, the drive transistor, a fifth switching transistor, and the light-emitting element coupled in series. The first switching transistor has the second coupling terminal electrically coupled with the first coupling terminal of the drive transistor. The fifth switching transistor is electrically coupled between the second coupling terminal of the drive transistor and the second terminal of the light-emitting element. In the light-emitting phase, the first switching transistor is configured to be conducted in response to the scan signal received at the control terminal of the first switching transistor, and the fifth switching transistor is configured to be conducted in response to a scan signal received at a control terminal of the fifth switching transistor, so that the light-emitting loop is conducted.

Optionally, the energy-storage-capacitor reset loop includes the energy-storage capacitor and a sixth switching transistor coupled in series. The sixth switching transistor has a first coupling terminal configured to receive the first reset-voltage and a second coupling terminal electrically coupled with the first terminal of the energy-storage capacitor. In the reset phase, the sixth switching transistor is configured to be conducted in response to a scan signal received at a control terminal of the sixth switching transistor, so that the energy-storage-capacitor reset loop is conducted.

Optionally, the pixel drive circuit further includes a light-emitting-element reset loop, and the light-emitting-element reset loop includes a seventh switching transistor and the light-emitting element coupled in series. The seventh switching transistor has a first coupling terminal configured to receive the second reset-voltage and the first coupling terminal electrically coupled with the second terminal of the light-emitting element. In the reset phase, the seventh switching transistor is configured to be conducted in response to a scan signal received at a control terminal of the seventh switching transistor, so that the light-emitting-element reset loop is conducted, and a voltage at the second terminal of the light-emitting element is reset to reach a value of the second reset-voltage.

Optionally, the first switching transistor, the second switching transistor, the third switching transistor, the fourth switching transistor, the fifth switching transistor, the sixth switching transistor, the seventh switching transistor, and the drive transistor each are a low-level conduction transistor.

Optionally, the drive transistor is a Low Temperature Polysilicon Thin Film Transistor (LTPS TFT). The first switching transistor, the second switching transistor, the third switching transistor, the fourth switching transistor, the fifth switching transistor, the sixth switching transistor, and the seventh switching transistor each are an Oxide Semiconductor Thin Film Transistor (Oxide TFT).

Optionally, the first voltage received at the second terminal of the energy-storage capacitor includes the drive voltage or the zero-potential voltage.

A display panel is further provided in the disclosure. The display panel includes a substrate and multiple pixel drive circuits mentioned above. The substrate includes a display region, and the multiple pixel drive circuits are arranged in an array in the display region of the substrate.

Additional aspects and advantages of the disclosure will be partially illustrated hereinafter, and part of the additional aspects and advantages will become apparent with reference to the following illustration or be learned through practices of the disclosure.

The disclosure is further illustrated in the following implementations with reference to the above accompanying drawings.

DETAILED DESCRIPTION

The following will illustrate clearly and completely technical solutions of implementations of the disclosure with reference to accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within a protection scope of the disclosure.

In illustration of the disclosure, it should be noted that directional or positional relationships indicated by terms such as “on”, “under”, “left”, “right”, and the like are directional or positional relationships based on accompanying drawings and are only for the convenience of illustration and simplicity, rather than explicitly or implicitly indicate that devices or elements referred to herein must have a certain direction or be structured or operated in a certain direction and therefore cannot be understood as limitations to the disclosure. In addition, terms “first”, “second”, and the like are only used for illustration and cannot be understood as explicitly or implicitly indicating relative importance.

Figure 1:
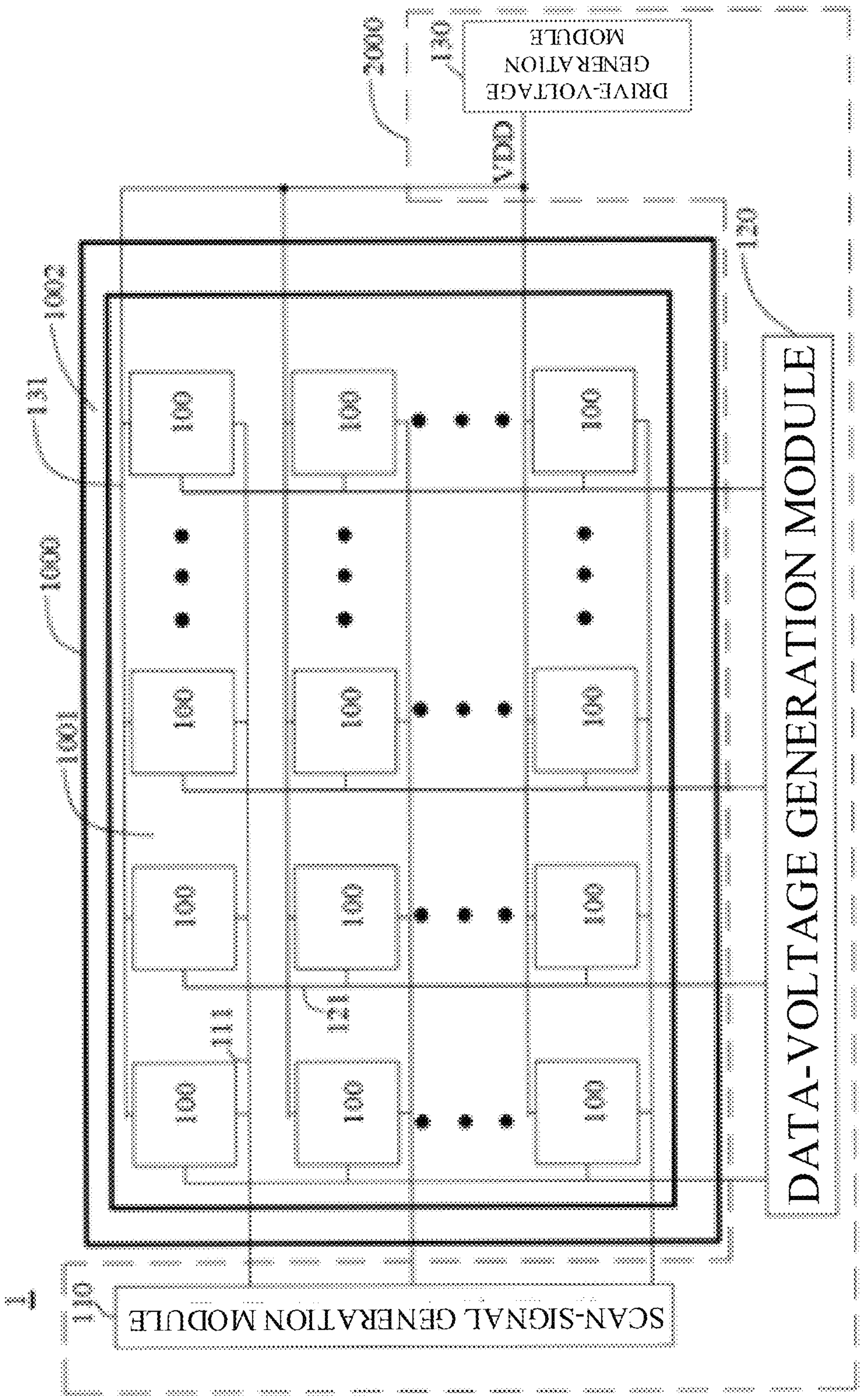
FIG. 1 is a schematic structural diagram of a display panel provided in implementations of the disclosure.

Referring to FIG. 1, a display panel 1 is provided in the disclosure and includes a substrate 1000 and a main drive circuit 2000 that are electrically coupled with each other. The substrate 1000 includes a display region 1001 and a non-display region 1002. The substrate 1000 is provided with multiple pixel drive circuits 100 arranged in an array in the display region 1001. The main drive circuit 2000 includes a scan-signal generation module 110, a data-voltage generation module 120, and a drive-voltage generation module 130. The scan-signal generation module 110 is electrically coupled with multiple rows of pixel drive circuits 100 via multiple scan lines 111, respectively, and is configured to generate a corresponding scan signal for each row of pixel drive circuits 100. The data-voltage generation module 120 is electrically coupled with multiple columns of pixel drive circuits 100 via multiple data lines 121, respectively, and is configured to generate a corresponding data voltage Vdata for each column of pixel drive circuits 100. The drive-voltage generation module 130 is electrically coupled with the multiple rows of pixel drive circuits 100 via multiple power-supply voltage lines 131, respectively, and is configured to generate a drive voltage signal VDD for each row of pixel drive circuits 100.

In view of above, the pixel drive circuits 100 and the display panel 1 are provided in the disclosure, which aim at solving at least a problem that display brightness of an Organic Light-Emitting Diode (OLED) in an existing pixel drive circuit has correlation with a drive voltage VDD, which causes brightness differences among OLEDs at different distances from a power-supply chip, and thus causes that a Mura phenomenon cannot be completely eliminated and a visual experience of a user is seriously affected.

Figure 2:
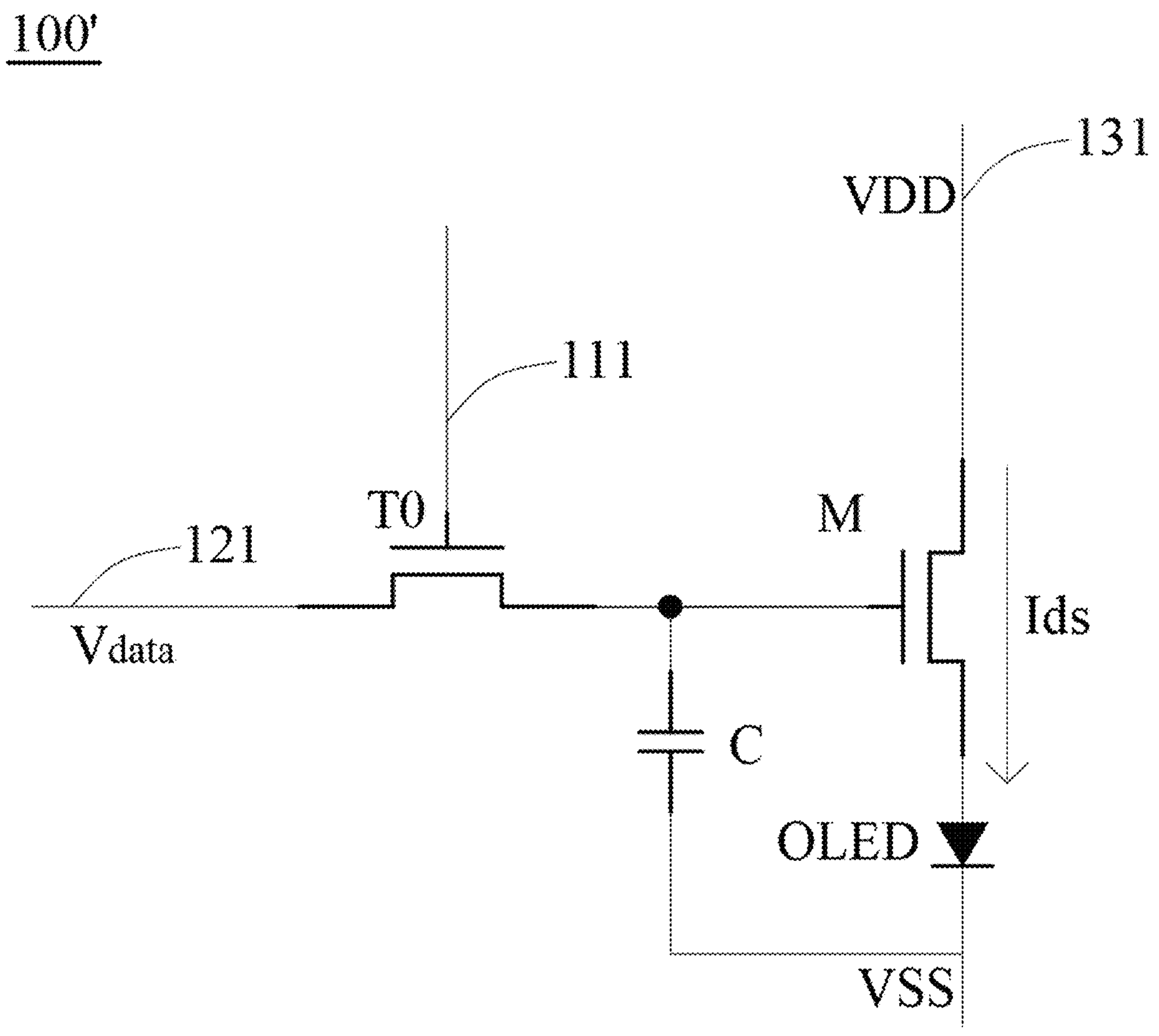
FIG. 2 is a schematic structural diagram of an existing pixel drive circuit.

Refer to FIG. 2, which illustrates an existing pixel drive circuit 100' of Two-Transistors-One-Capacitor (2T1C). The pixel drive circuit 100' includes a scan transistor TO, a drive transistor M, an energy-storage capacitor C, and a light-emitting element.

The pixel drive circuit 100' is configured to drive the light-emitting element to emit lights. In implementations of the disclosure, the light-emitting element is an Organic Light-Emitting Diode (OLED), and the light-emitting element has a first terminal serving as a cathode of the OLED and a second terminal serving as an anode of the OLED. In other implementations, the light-emitting element may be a Light-Emitting Diode (LED), a micro LED, or a mini LED. The cathode of the light-emitting element OLED is electrically coupled with a reference voltage terminal and configured to receive a reference voltage Vss. The drive transistor M has a source electrically coupled with the power-supply voltage line 131 and configured to receive the drive voltage VDD, a drain electrically coupled with the anode of the light-emitting element OLED, and a gate electrically coupled with a drain of the scan transistor TO. The scan transistor TO has a source electrically coupled with the data line 121 and configured to receive the data voltage Vdata and a gate electrically coupled with the scan line 111 and configured to receive the scan signal. The energy-storage capacitor C has a first terminal electrically coupled with the gate of the drive transistor M and a second terminal electrically coupled with the cathode of the light-emitting element OLED. Exemplarily, when the scan signal is a signal for turning the scan transistor TO on, the scan transistor TO is on, the energy-storage capacitor C is charged by a data voltage signal Vdata of the data line 121 via the scan transistor TO, so that a voltage at the first terminal of the energy-storage capacitor C is adjusted to reach a value of the data voltage Vdata, and thus the drive transistor M can drive the light-emitting element OLED to emit lights according to the data voltage Vdata received at the gate of the drive transistor M and the drive voltage VDD received at the source of the drive transistor M, and at this time, a gate-source voltage Vgs of the drive transistor M satisfies the expression Vgs=Vg−Vs=Vdata−VDD, and a current Ids flowing through the light-emitting element OLED and the gate-source voltage Vgs of the drive transistor M satisfy the expression: $Ids=(K/2)(Vgs-Vth)^2=(K/2)(Vdata-VDD-Vth)^2$, where K=Cox×μ×W/L, Cox represents a gate capacitance per unit area, μ represents a migration rate of channel electron motion, W/L represents a width-to-length ratio of a channel of the drive transistor M, and Vth represents a threshold voltage of the drive transistor M.

The brightness of the light-emitting element OLED is proportional to the current Ids flowing through the light-emitting element OLED, i.e., the brightness of the light-emitting element OLED has correlation with the data voltage Vdata, the drive voltage VDD, and the threshold voltage Vth of the drive transistor M. In order to avoid uneven display brightness of the display panel due to differences among threshold voltages Vth of different drive transistors M, the pixel drive circuit 100' in an existing display panel is designed as a drive circuit (not illustrated) with a threshold compensation function, so that the drive circuit can operate sequentially in a reset phase, a data-writing phase, and a light-emitting phase, and the energy-storage capacitor C is charged in the data-writing phase by the drive circuit to adjust the voltage at the first terminal of the energy-storage capacitor C to reach a value of (Vdata+Vth), and at this time, the gate-source voltage Vgs of the drive transistor M satisfies the expression Vgs=Vg−Vs=(Vdata+Vth)−VDD, and thus the current Ids flowing through the light-emitting element OLED and the gate-source voltage Vgs of the drive transistor M satisfy the expression: $Ids=(K/2)(Vgs-Vth)^2=(K/2)(Vdata-VDD)^2$.

As can be known from the above expressions, the brightness of the light-emitting element OLED has correlation with the data voltage Vdata and the drive voltage VDD but has no correlation with the threshold voltage Vth of the drive transistor M, so that uneven display brightness of the display panel 1 due to differences among threshold voltages Vth of different drive transistors M can be eliminated. However, the power-supply line 131 for transmission of a drive voltage VDD has a line impedance that may make pixel drive circuits 100 at different distances from the drive-voltage generation module 130 receive different drive voltages VDD, thereby resulting in display brightness differences among light-emitting element OLEDs at different distances from the drive-voltage generation module 130, and thus a Mura phenomenon cannot be completely eliminated, and the larger the display panel 1, the more obvious the Mura phenomenon, seriously affecting a visual experience of a user.

Figure 3:
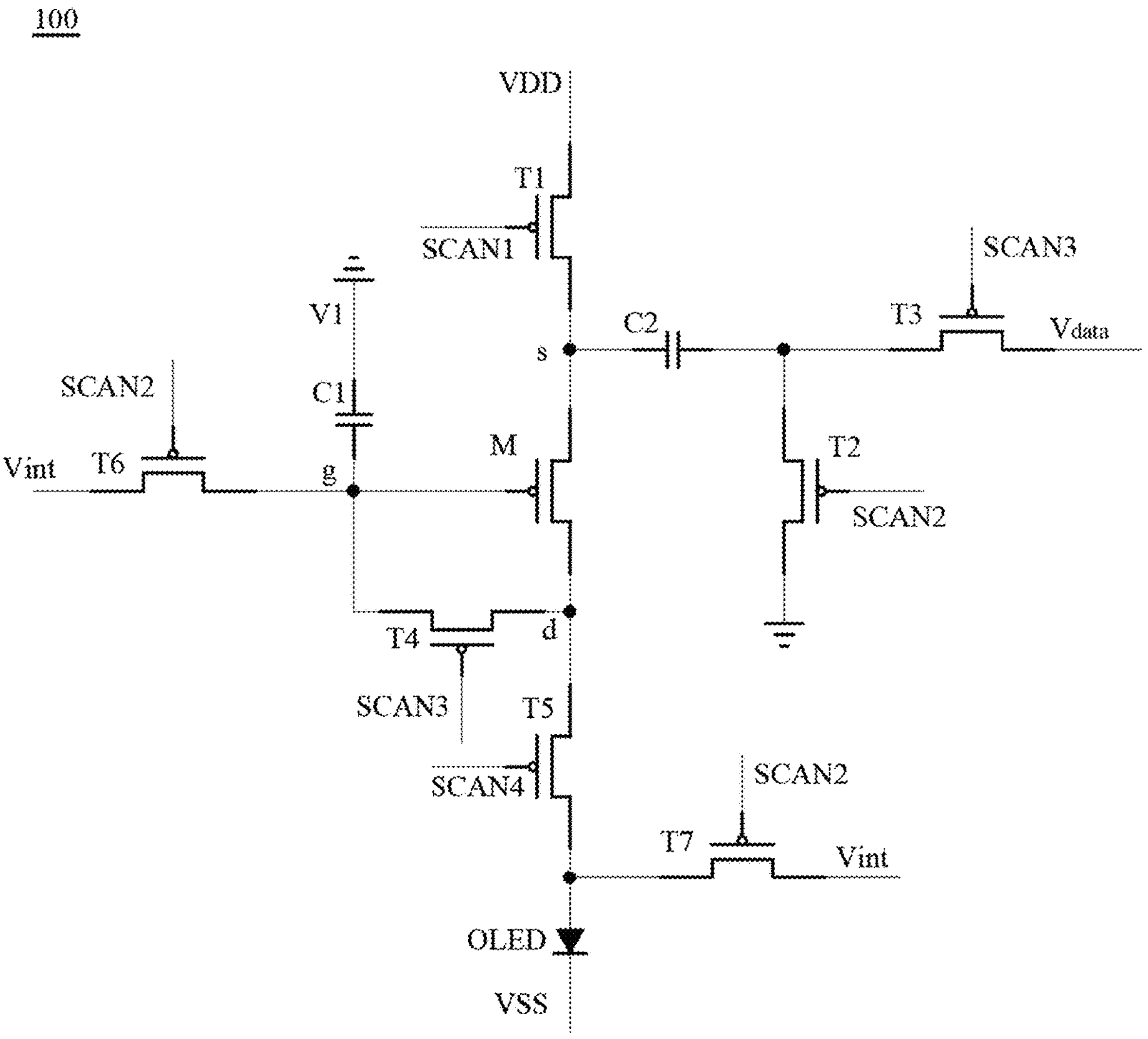
FIG. 3 is a schematic structural diagram of a pixel drive circuit provided in implementations of the disclosure.

Referring to FIG. 3, to solve the problem of uneven display brightness due to the line impedance of the power-supply line 131 in the existing pixel drive circuit, a pixel drive circuit 100 is provided in the disclosure. The pixel drive circuit 100 is configured to drive a light-emitting element OLED to emit lights.

The pixel drive circuit 100 includes an energy-storage capacitor C1, a bootstrap capacitor C2, a drive transistor M, a first switching transistor T1, a second switching transistor T2, a third switching transistor T3, a fourth switching transistor T4, a fifth switching transistor T5, and a sixth switching transistor T6. The switching transistors T1 to T6 (that is, the switching transistors T1, T2, T3, T4, T5, T6) each have a control terminal electrically coupled with the scan-signal generation module 110. The switching transistors T1 to T6 may include at least one of a triode or a Metal-Oxide-Semiconductor (MOS) transistor. In the implementation, the switching transistors T1 to T6 and the drive transistor M each are a low-level conduction transistor, e.g., a Positive-MOS (PMOS) transistor. In another implementation, the switching transistors T1 to T6 and the drive transistor M each are a high-level conduction transistor, e.g., a Negative-MOS (NMOS) transistor. It can be understood that, the switching transistors T1 to T6 may be all designed as the same type of transistor, which is conducive to simplifying a manufacturing process of the substrate 1000 and reducing a processing difficulty and a production cost. In other implementations, the switching transistors T1 to T6 and the drive transistor M may also be different types of transistors, which are not limited herein. It needs to be noted that, the switching transistors T1 to T6 and the drive transistor M each may be an Amorphous Silicon Thin Film Transistor (a-Si TFT), a Low Temperature Polysilicon Thin Film Transistor (LTPS TFT), or an Oxide Semiconductor Thin Film Transistor (Oxide TFT). The Oxide TFT has an active layer made of an oxide semiconductor (Oxide) such as Indium Gallium Zinc Oxide (IGZO). Exemplarily, the switching transistors T1 to T6 each are an Oxide TFT, and the drive transistor M is a low-temperature polysilicon transistor. The low-temperature polysilicon transistor has a relatively high migration rate, thus it is possible to speed up a conduction of the drive transistor M, and in turn speed up response of the pixel drive circuit 100, thereby improving a display effect of the display panel 1.

For describing a circuit structure and an operating principle of the pixel drive circuit 100 more clearly, reference can be made to FIG. 4 and FIGS. 5*a*-5*c*.

Figure 4:
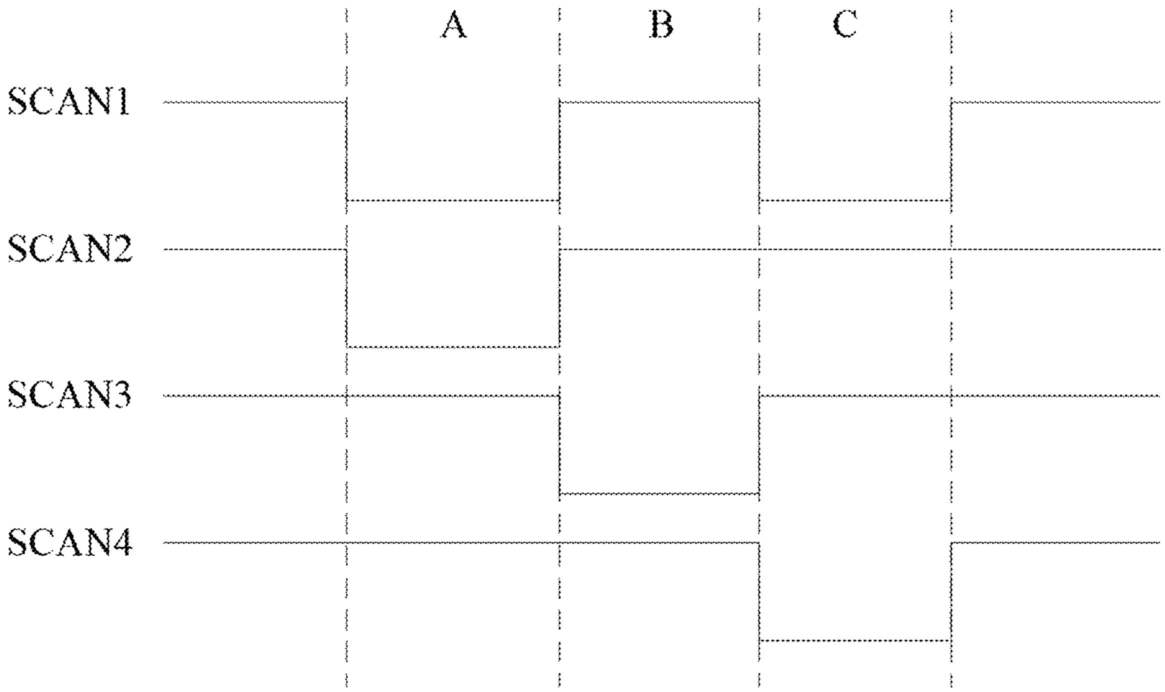
FIG. 4 is an operating timing diagram of the pixel drive circuit illustrated in FIG. 3.

As illustrated in FIG. 4, the pixel drive circuit 100 is operated sequentially in a reset phase (which is referred to as phase A), a data-writing phase (which is referred to as phase B), and a light-emitting phase (which is referred to as phase C) within a one-frame display period.

Figure 5A:
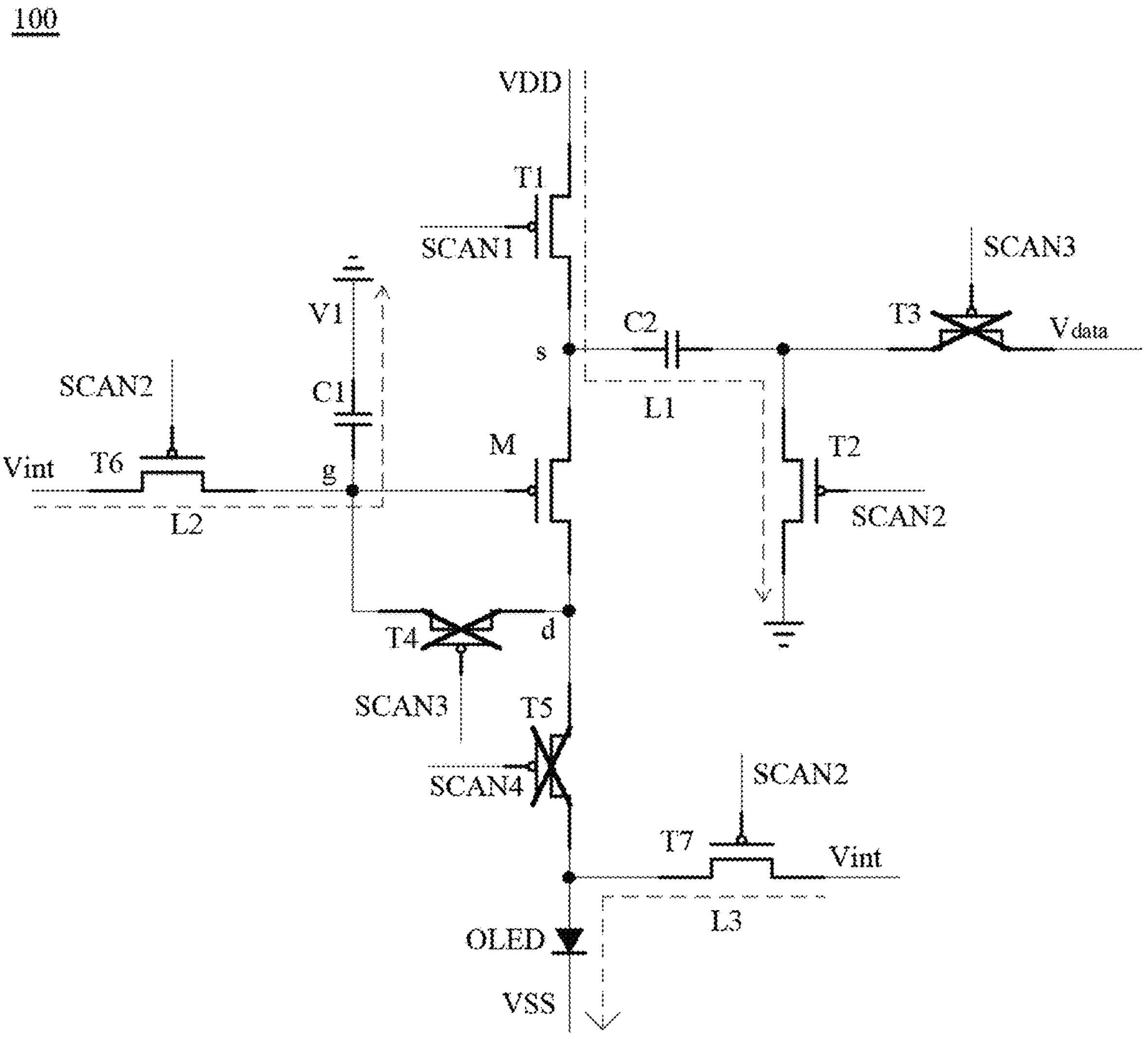
FIG. 5*a* is a schematic circuit diagram illustrating the pixel drive circuit illustrated in FIG. 3 in phase A.

As illustrated in FIG. 5*a*, the pixel drive circuit 100 includes a pre-charge loop L1 and an energy-storage-capacitor reset loop L2. The pre-charge loop L1 includes the first switching transistor T1, the bootstrap capacitor C2, and the second switching transistor T2 coupled in series. The first switching transistor T1 has a first coupling terminal configured to receive the drive voltage VDD and a second coupling terminal electrically coupled with a first terminal of the bootstrap capacitor C2. The second switching transistor T2 has a first coupling terminal electrically coupled with a grounding terminal and configured to receive a zero-potential voltage and a second coupling terminal electrically coupled with a second terminal of the bootstrap capacitor C2. The pre-charge loop L1 is configured to receive the drive voltage VDD to charge the bootstrap capacitor C2 when the pre-charge loop L1 is conducted (i.e., the first switching transistor T1 and the second switching transistor T2 each are turned on) in the reset phase, so that a voltage at the first terminal of the bootstrap capacitor C2 is adjusted to reach a value of the drive voltage VDD, a voltage at the second terminal of the bootstrap capacitor C2 is reset to reach a value of the zero-potential voltage, and a difference between the voltage at the first terminal of the bootstrap capacitor C2 and the voltage at the second terminal of the bootstrap capacitor C2 reaches the value of the drive voltage VDD. As such, the bootstrap capacitor C2 can drain residual charges from the previous one-frame display period to the grounding terminal through the second switching transistor T2, thereby resetting the voltage at the second terminal of the bootstrap capacitor C2 to reach zero-potential, and thus ensuring evenness of the display effect of the display panel 1.

The energy-storage-capacitor reset loop L2 includes the energy-storage capacitor C1 and the sixth switching transistor T6 coupled in series. The sixth switching transistor T6 has a first coupling terminal configured to receive a first reset-voltage and a second coupling terminal electrically coupled with a first terminal of the energy-storage capacitor C1. The energy-storage capacitor C1 has the first terminal electrically coupled with a control terminal (i.e., a gate g) of the drive transistor M and a second terminal configured to receive a first voltage V1 with a constant voltage value. When the energy-storage-capacitor reset loop L2 is conducted (i.e., the sixth switching transistor T6 is on) in the reset phase, the energy-storage-capacitor reset loop L2 is configured to receive the first reset-voltage to reset a voltage at the first terminal of the energy-storage capacitor C1, i.e., to charge the energy-storage capacitor C1, so that the voltage at the first terminal of the energy-storage capacitor C1 is reset to reach a value of the first reset-voltage. As such, it is possible to prevent a voltage across the energy-storage capacitor C1 from being affected by the residual charges from the previous one-frame display period in the light-emitting phase, and thus the voltage at the first terminal of the energy-storage capacitor C1 has the same initial value (i.e., the value of the first reset-voltage) in the data-writing phase within every one-frame display period, thereby ensuring the evenness of the display effect of the display panel 1. In the implementation, the first voltage V1 received at the second terminal of the energy-storage capacitor C1 is zero-potential. In other implementations, the first voltage V1 may be the drive voltage VDD.

Furthermore, the light-emitting element OLED has a first terminal configured to receive a reference voltage VSS and a second terminal electrically coupled with a second coupling terminal (i.e., a drain d) of the drive transistor M.

Optionally, the pixel drive circuit 100 further includes a light-emitting-element reset loop L3. The light-emitting-element reset loop L3 includes the seventh switching transistor T7 and the light-emitting element OLED coupled in series. The seventh switching transistor T7 has a first coupling terminal configured to receive a second reset-voltage and a secondcoupling terminal electrically coupled with the second terminal of the light-emitting element OLED. The light-emitting-element reset loop L3 is configured to reset a voltage at the second terminal of the light-emitting element OLED to reach a value of the second reset-voltage when the light-emitting-element reset loop L3 is conducted (i.e., the seventh switching transistor T7 is on) in the reset phase. As such, it is possible to prevent a voltage at the second terminal of the light-emitting element OLED from being affected by the residual charges from the previous one-frame display period in the light-emitting phase, and thus the voltage at the second terminal of the light-emitting element OLED has the same initial value (i.e., the value of the second reset-voltage) in the light-emitting phase within every one-frame display period, thereby further improving the evenness of the display effect of the display panel 1. Exemplarily, the first reset-voltage and the second reset-voltage each are equal to a reset voltage Vint, where Vint <VSS, so that the second reset-voltage will not cause the light-emitting element OLED to emit lights accidentally in the reset phase. In other implementations, the first reset-voltage may be not equal to the second reset-voltage.

Figure 5B:
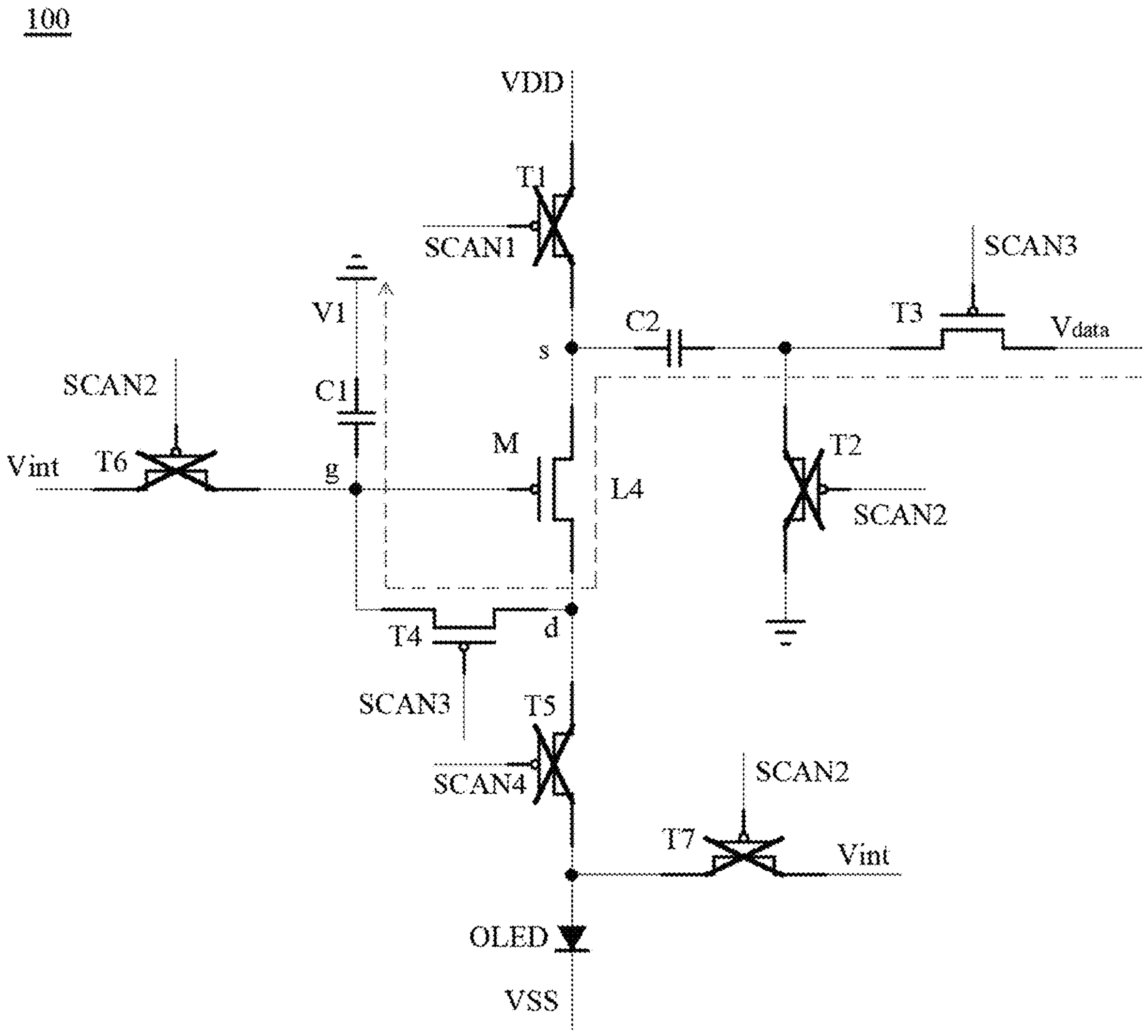
FIG. 5*b* is a schematic circuit diagram illustrating the pixel drive circuit illustrated in FIG. 3 in phase B.

As illustrated in FIG. 5*b*, the pixel drive circuit 100 further includes a data-writing loop L4. The data-writing loop L4 includes the third switching transistor T3, the bootstrap capacitor C2, the drive transistor M, the fourth switching transistor T4, and the energy-storage capacitor C1 coupled in series. Specifically, the third switching transistor T3 has a first coupling terminal configured to receive the data voltage Vdata and a second coupling terminal electrically coupled with the second terminal of the bootstrap capacitor C2. The bootstrap capacitor C2 has the first terminal further electrically coupled with a first coupling terminal (i.e., a source s) of the drive transistor M. The fourth switching transistor T4 is electrically coupled between the second coupling terminal of the drive transistor M and the first terminal of the energy-storage capacitor C1. When the data-writing loop L4 is conducted in the data-writing phase, the data-writing loop L4 is configured to receive the data voltage Vdata at the first coupling terminal of the third switching transistor T3 to charge the energy-storage capacitor C1 based on a bootstrap effect of the bootstrap capacitor C2, so that a voltage at the control terminal of the drive transistor M is adjusted from the value of the first reset-voltage to a value of a second voltage. The drive transistor M is in a critical conduction state when the voltage at the control terminal of the drive transistor M is equal to the second voltage, and the second voltage is equal to a sum of the drive voltage VDD, the data voltage, and a threshold voltage of the drive transistor M. It needs to be noted that, the third switching transistor T3 can drain residual charges from the previous one-frame display period to the grounding terminal through the second switching transistor T2, thereby avoiding an adverse effect of the residual charges from the previous one-frame display period.

Specifically, as mentioned above, the difference between the voltage at the first terminal of the bootstrap capacitor C2 and the voltage at the second terminal of the bootstrap capacitor C2 is equal to the drive voltage VDD, the voltage at the second terminal of the bootstrap capacitor C2 changes from the zero-potential to the value of the data voltage Vdata when the bootstrap capacitor C2 receives the data voltage Vdata, i.e., a potential at the second terminal of the bootstrap capacitor C2 has increased by the value of the data voltage Vdata, and thus a potential at the first terminal (i.e., a source voltage Vs of the drive transistor M) of the bootstrap capacitor C2 is changed to reach the value of (Vdata+VDD) with the aid of the bootstrap effect of the bootstrap capacitor C2. In the data-writing phase, at the moment of starting to charge the energy-storage capacitor C1, a gate voltage Vg of the drive transistor M satisfies Vg=Vint, and the source voltage Vs of the drive transistor M satisfies Vs=Vdata+VDD, and at this moment, the gate-source voltage Vgs of the drive transistor M satisfies the expression: Vgs=Vg−Vs=Vint−Vdata<Vth, and thus the drive transistor M is turned on. Vth represents the threshold voltage of the drive transistor M, the drive transistor M is turned on when Vgs<Vth, and the drive transistor M is cut off when Vgs>Vth. The energy-storage capacitor C1 is charged by the source voltage Vs via the data-writing loop L4 that is conducted, such that the voltage at the first terminal of the energy-storage capacitor C1 rises continuously. When the voltage at the first terminal of the energy-storage capacitor C1 has risen to Vg=Vdata+VDD+Vth, Vgs=(Vdata+VDD+Vth)−(Vdata+VDD)=Vth, and thus the drive transistor M is in the critical conduction state, so that the voltage at the first terminal of the energy-storage capacitor C1 does not rise any more, where the second voltage is equal to Vdata+VDD+Vth. It needs to be noted that, with the aid of the bootstrap effect, transmission of the data voltage Vdata to the energy-storage capacitor C1 is speeded up, thereby shortening a duration of the data-writing phase and a duration of the one-frame display period, and thus facilitating improving a refresh frequency of the display panel 1.

Figure 5C:
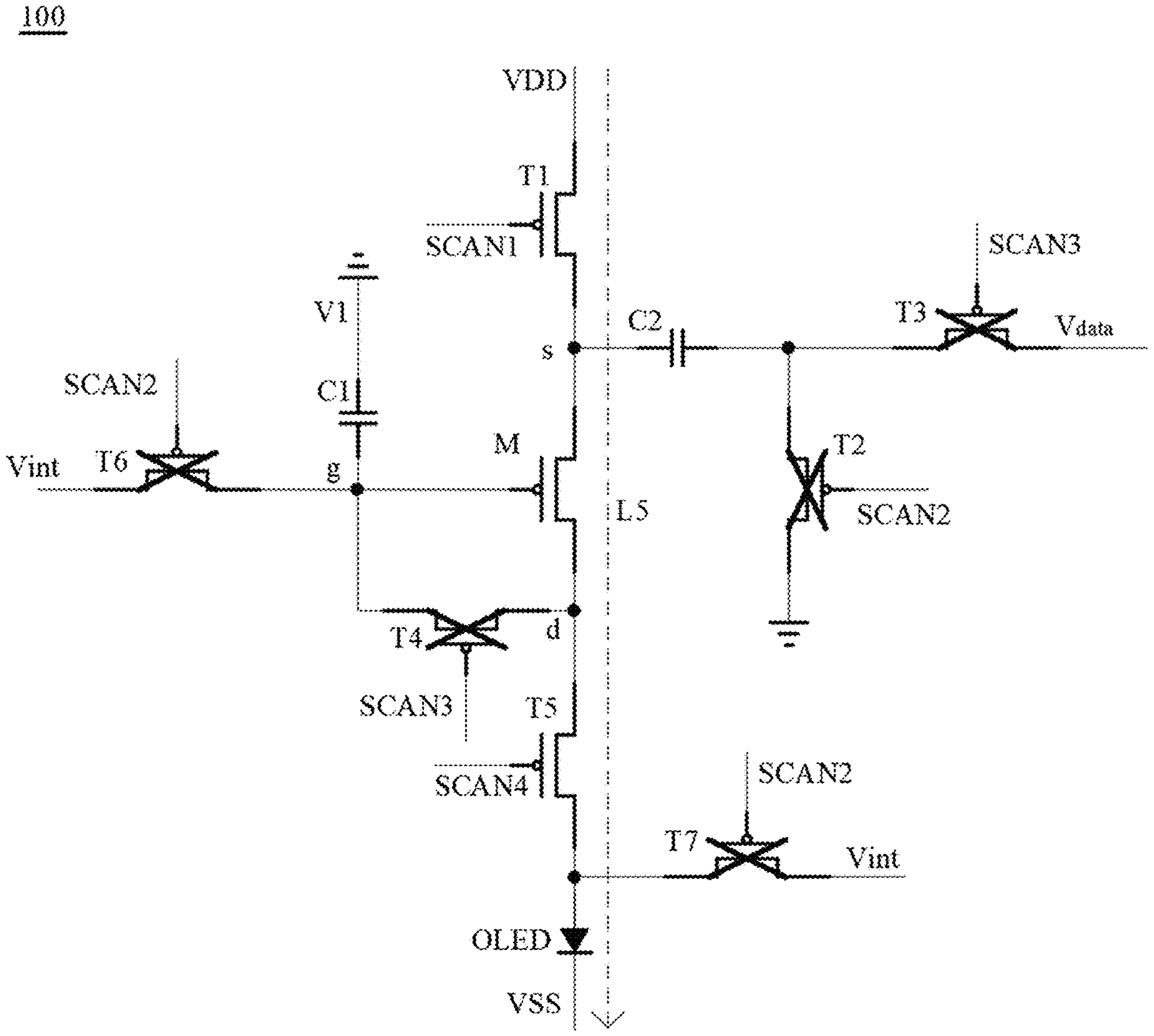
FIG. 5*c* is a schematic circuit diagram illustrating the pixel drive circuit illustrated in FIG. 3 in phase C.

As illustrated in FIG. 5*c*, the pixel drive circuit 100 further includes a light-emitting loop L5. The light-emitting loop L5 includes the first switching transistor T1, the drive transistor M, the fifth switching transistor T5, and the light-emitting element OLED coupled in series. The fifth switching transistor T5 is electrically coupled between the second coupling terminal of the drive transistor M and the second terminal of the light-emitting element OLED. The first coupling terminal of the drive transistor M is configured to receive the drive voltage VDD to drive the light-emitting element OLED to emit lights when the light-emitting loop L5 is conducted in the light-emitting phase.

Specifically, in the light-emitting phase, the drive transistor M is constantly on. Since the first switching transistor T1 and the fifth switching transistor T5 each are operated in a linear region but the drive transistor M is operated in a saturation region, an amount of the current flowing through the light-emitting element OLED depends mostly on the current Ids between the source and the drain of the drive transistor M. According to operating characteristics of a switching transistor, it is known that the current Ids and the gate-source voltage Vgs satisfy the following expression: $Ids=(K/2)(Vgs-Vth)^2=(K/2)(Vdata)^2$, where K=Cox×μ×W/L, Cox represents a gate capacitance per unit area, μ represents a migration rate of channel electron motion, and W/L represents a width-to-length ratio of a channel of the drive transistor M.

As can be known from the above formula, the data-writing loop L3 can provide a compensation voltage for the drive transistor M, such that the current Ids flowing through the light-emitting element OLED has no correlation with both the threshold voltage Vth of the drive transistor M and the drive voltage VDD. That is to say, light-emitting brightness of the light-emitting element OLED can be precisely controlled as long as a writing accuracy of the data voltage Vdata is ensured. Therefore, the pixel drive circuit 100 provided in the disclosure can eliminate uneven display brightness of the display panel 1 due to differences among the threshold voltages of the drive transistors M in different pixel drive circuits 100 and can also eliminate uneven display brightness of the display panel 1 due to different drive voltages VDD received by different pixel drive circuits 100. In addition, since the current Ids flowing through the light-emitting element OLED has no correlation with the drive voltage VDD, the drive voltage VDD can be moderately decreased according to a characteristic that the voltage difference between the first terminal and the second terminal of the light-emitting element OLED remains constant and thus the light-emitting brightness of the light-emitting element OLED remains constant, thereby reducing power consumption of the pixel drive circuit 100.

As mentioned above, in the implementation, the switching transistors T1 to T7 and the drive transistor M each are a low-level conduction transistor. An operation process of the pixel drive circuit 100 provided in the disclosure within a one-frame scan period is described in detail hereinafter with reference to FIGS. 3-5*c*.

In implementations of the disclosure, a scan signal received at the control terminal of the first switching transistor T1 is a first scan signal SCAN1, a scan signal received at the control terminal of the second switching transistor T2, a scan signal received at the control terminal of the sixth switching transistor T6, and a scan signal received at the control terminal of the seventh switching transistor T7 each are a second scan signal SCAN2, a scan signal received at the control terminal of the third switching transistor T3 and a scan signal received at the control terminal of the fourth switching transistor T4 each are a third scan signal SCAN3, and a scan signal received at the control terminal of the fifth switching transistor T5 is a fourth scan signal SCAN4. Switching transistors with a same conduction timing can be controlled via a same scan signal, thereby simplifying a wiring structure of the substrate 1000. In other implementations, a scan signal may be set for individually controlling every single switching transistor, which is not limited herein.

In the reset phase (phase A), the first scan signal SCAN1 and the second scan signal SCAN2 each are low-level, the third scan signal SCAN3 and the fourth scan signal SCAN4 each are high-level. Therefore, the switching transistors T1, T2, T6, T7 each are turned on, and the switching transistors T3 to T5 each are cut off, so that the pre-charge loop L1 is conducted to allow the voltage at the first terminal of the bootstrap capacitor C2 to be adjusted to reach the value of the drive voltage VDD and the voltage at the second terminal of the bootstrap capacitor C2 to be reset to reach the zero-potential, the energy-storage-capacitor reset loop L2 is conducted to allow the voltage at the first terminal of the energy-storage capacitor C1 to be reset to reach the value of the first reset-voltage, the light-emitting-element reset loop L3 is conducted to allow the voltage at the second terminal of the light-emitting element OLED to be reset to reach the value of the second reset-voltage, and the data-writing loop L4 and the light-emitting loop L5 each are cut off.

In the data-writing phase (phase B), the third scan signal SCAN3 is low-level, and the first scan signal SCAN1, the second scan signal SCAN2, and the fourth scan signal SCAN4 each are high-level. Therefore, the switching transistors T3, T4, and the drive transistor M each are turned on, and the switching transistors T1, T2, T5, T6, T7 each are cut off, so that the data-writing loop L4 is conducted to allow the voltage at the control terminal of the drive transistor M to be adjusted from the value of the first reset-voltage to the value of the second voltage, and the pre-charge loop L1, the energy-storage-capacitor reset loop L2, the light-emitting-element reset loop L3, and the light-emitting loop L5 each are cut off.

In the light-emitting phase (phase C), the first scan signal SCAN1 and the fourth scan signal SCAN4 each are low-level, and the second scan signal SCAN2 and the third scan signal SCAN3 each are high-level. Therefore, the switching transistors T1, T5, and the drive transistor M each are turned on, and the switching transistors T2, T3, T4, T6, T7 each are cut off, so that, the light-emitting loop L5 is conducted to receive the drive voltage VDD to drive the light-emitting element OLED to emit lights, and the pre-charge loop L1, the energy-storage-capacitor reset loop L2, the light-emitting-element reset loop L3, and the data-writing loop L4 each are cut off.

In the pixel drive circuit 100 provided in the disclosure, the pre-charge loop L1 is configured to charge the bootstrap capacitor C2 in the reset phase to make the voltage at the first terminal of the bootstrap capacitor C2 reach the value of the drive voltage VDD, and the second terminal of the bootstrap capacitor C2 is configured to receive the data voltage Vdata in the data-writing phase to charge the energy-storage capacitor C1 based on the bootstrap effect of the bootstrap capacitor C2, so that the voltage at the control terminal of the drive transistor M is adjusted to reach the value of the second voltage that is equal to the sum of the drive voltage VDD, the data voltage Vdata, and the threshold voltage Vth of the drive transistor M. The drive transistor M is configured to drive the light-emitting element OLED to emit lights in the light-emitting phase according to the second voltage received at the control terminal of the drive transistor M and the drive voltage Vdata received at the first coupling terminal of the drive transistor M, so that the current flowing through the light-emitting element OLED has no correlation with the drive voltage VDD and the threshold voltage Vth of the drive transistor M. As such, uneven display brightness of the display panel 1 due to differences among the threshold voltages of the drive transistors M in different pixel drive circuits 100 can be eliminated, and uneven display brightness of the display panel 1 due to different drive voltages VDD received by different pixel drive circuits 100 can also be eliminated.

Although implementations of the disclosure have been shown and described, it will be understood by those of ordinary skill in the art that a variety of variations, modifications, replacements and variants of these implementations may be made without departing from the principles and purposes of the disclosure, the scope of which is limited by the claims and their equivalents.

What is claimed is:

1. A pixel drive circuit configured to drive a light-emitting element to emit lights, the light-emitting element having a first terminal configured to receive a reference voltage, the pixel drive circuit being operated sequentially in a reset phase, a data-writing phase, and a light-emitting phase within a one-frame display period, and the pixel drive circuit comprising:

a drive transistor comprising a control terminal, a first coupling terminal, and a second coupling terminal, wherein the first coupling terminal is configured to receive a drive voltage, and the second coupling terminal is electrically coupled with a second terminal of the light-emitting element;

an energy-storage capacitor having a first terminal electrically coupled with the control terminal of the drive transistor and a second terminal that is grounded;

an energy-storage-capacitor reset loop configured to receive a first reset-voltage to reset a voltage at the first terminal of the energy-storage capacitor to reach a value of the first reset-voltage when the energy-storage-capacitor reset loop is conducted in the reset phase;

a bootstrap capacitor having a first terminal electrically coupled with the first coupling terminal of the drive transistor and a second terminal configured to receive a zero-potential voltage in the reset phase and receive a data voltage in the data-writing phase;

a pre-charge loop configured to receive the drive voltage to charge the bootstrap capacitor when the pre-charge loop is conducted in the reset phase, so that a voltage at the first terminal of the bootstrap capacitor is adjusted to reach a value of the drive voltage, a voltage at the second terminal of the bootstrap capacitor is reset to reach a value of the zero-potential voltage, and a difference between the voltage at the first terminal of the bootstrap capacitor and the voltage at the second terminal of the bootstrap capacitor reaches the value of the drive voltage;

a data-writing loop comprising the bootstrap capacitor, the drive transistor, and the energy-storage capacitor coupled in series, wherein the data-writing loop is configured to receive the data voltage at the second terminal of the bootstrap capacitor to charge the energy-storage capacitor based on a bootstrap effect of the bootstrap capacitor when the data-writing loop is conducted in the data-writing phase, so that a voltage at the control terminal of the drive transistor is adjusted from the value of the first reset-voltage to a value of a second voltage, and wherein the drive transistor is in a critical conduction state when the voltage at the control terminal of the drive transistor is equal to the second voltage, and the second voltage is equal to a sum of the drive voltage, the data voltage, and a threshold voltage of the drive transistor; and a light-emitting loop comprising the drive transistor and the light-emitting element coupled in series, wherein the first coupling terminal of the drive transistor is configured to receive the drive voltage to drive the light-emitting element to emit lights when the light-emitting loop is conducted in the light-emitting phase;

wherein in the light-emitting phase, a current between a source of the drive transistor and a drain of the drive transistor is equal to $(K/2)*(Vdata)^{C2}$, wherein $K=Cox \times \mu \times W/L$, Cox represents a gate capacitance per unit area of the drive transistor, u represents a migration rate of channel electron motion of the drive transistor, W/L represents a width-to-length ratio of a channel of the drive transistor, and Vdata represents the data voltage;

wherein the pre-charge loop comprises a first switching transistor, the bootstrap capacitor, and a second switching transistor coupled in series;

wherein the data-writing loop comprises a third switching transistor, the bootstrap capacitor, the drive transistor, a fourth switching transistor, and the energy-storage capacitor coupled in series;

wherein the light-emitting loop comprises the first switching transistor, the drive transistor, a fifth switching transistor, and the light-emitting element coupled in series;

wherein the energy-storage-capacitor reset loop comprises the energy-storage capacitor and a sixth switching transistor coupled in series;

wherein the pixel drive circuit further comprises a light-emitting-element reset loop, and the light-emitting-element reset loop comprises a seventh switching transistor and the light-emitting element coupled in series; and wherein a control terminal of the second switching transistor, a control terminal of the sixth switching transistor, and a control terminal of the seventh switching transistor are configured to receive a same scan signal during the reset phase, the data-writing phase, and the light-emitting phase within the one-frame display period.

2. The pixel drive circuit of claim 1, wherein the first switching transistor has a first coupling terminal configured to receive the drive voltage and a second coupling terminal electrically coupled with the first terminal of the bootstrap capacitor;

the second switching transistor has a first coupling terminal electrically coupled with a grounding terminal and configured to receive the zero-potential voltage and a second coupling terminal electrically coupled with the second terminal of the bootstrap capacitor; and in the reset phase, the first switching transistor is configured to be conducted in response to a scan signal received at a control terminal of the first switching transistor, and the second switching transistor is configured to be conducted in response to a scan signal received at the control terminal of the second switching transistor, so that the pre-charge loop is conducted.

3. The pixel drive circuit of claim 2, wherein the third switching transistor has a first coupling terminal configured to receive the data voltage and a second coupling terminal electrically coupled with the second terminal of the bootstrap capacitor;

the fourth switching transistor is electrically coupled between the second coupling terminal of the drive transistor and the first terminal of the energy-storage capacitor; and in the data-writing phase, the third switching transistor is configured to be conducted in response to a scan signal received at a control terminal of the third switching transistor, and the fourth switching transistor is configured to be conducted in response to a scan signal received at a control terminal of the fourth switching transistor, so that the data-writing loop is conducted.

4. The pixel drive circuit of claim 3, wherein the first switching transistor has the second coupling terminal electrically coupled with the first coupling terminal of the drive transistor;

the fifth switching transistor is electrically coupled between the second coupling terminal of the drive transistor and the second terminal of the light-emitting element; and in the light-emitting phase, the first switching transistor is configured to be conducted in response to the scan signal received at the control terminal of the first switching transistor, and the fifth switching transistor is configured to be conducted in response to a scan signal received at a control terminal of the fifth switching transistor, so that the light-emitting loop is conducted.

5. The pixel drive circuit of claim 4, wherein the sixth switching transistor has a first coupling terminal configured to receive the first reset-voltage and a second coupling terminal electrically coupled with the first terminal of the energy-storage capacitor; and in the reset phase, the sixth switching transistor is configured to be conducted in response to a scan signal received at the control terminal of the sixth switching transistor, so that the energy-storage-capacitor reset loop is conducted.

6. The pixel drive circuit of claim 5, the seventh switching transistor has a first coupling terminal configured to receive the second reset-voltage and a second coupling terminal electrically coupled with the second terminal of the light-emitting element; and in the reset phase, the seventh switching transistor is configured to be conducted in response to a scan signal received at the control terminal of the seventh switching transistor, so that the light-emitting-element reset loop is conducted, and a voltage at the second terminal of the light-emitting element is reset to reach a value of the second reset-voltage.

7. The pixel drive circuit of claim 6, wherein the first switching transistor, the second switching transistor, the third switching transistor, the fourth switching transistor, the fifth switching transistor, the sixth switching transistor, the seventh switching transistor, and the drive transistor each are a low-level conduction transistor.

8. The pixel drive circuit of claim 7, wherein the drive transistor is a Low Temperature Polysilicon Thin Film Transistor (LTPS TFT); and the first switching transistor, the second switching transistor, the third switching transistor, the fourth switching transistor, the fifth switching transistor, the sixth switching transistor, and the seventh switching transistor each are an Oxide Semiconductor Thin Film Transistor (Oxide TFT).

9. A display panel, comprising a substrate and a plurality of pixel drive circuits, the substrate comprising a display region, and the plurality of pixel drive circuits being arranged in an array in the display region of the substrate, wherein the pixel drive circuit is configured to drive a light-emitting element to emit lights, wherein the light-emitting element has a first terminal configured to receive a reference voltage, the pixel drive circuit is operated sequentially in a reset phase, a data-writing phase, and a light-emitting phase within a one-frame display period, and the pixel drive circuit comprises:

a drive transistor comprising a control terminal, a first coupling terminal, and a second coupling terminal, wherein the first coupling terminal is configured to receive a drive voltage, and the second coupling terminal is electrically coupled with a second terminal of the light-emitting element;

an energy-storage capacitor having a first terminal electrically coupled with the control terminal of the drive transistor and a second terminal that is grounded;

an energy-storage-capacitor reset loop configured to receive a first reset-voltage to reset a voltage at the first terminal of the energy-storage capacitor to reach a value of the first reset-voltage when the energy-storage-capacitor reset loop is conducted in the reset phase;

a bootstrap capacitor having a first terminal electrically coupled with the first coupling terminal of the drive transistor and a second terminal configured to receive a zero-potential voltage in the reset phase and receive a data voltage in the data-writing phase;

a pre-charge loop configured to receive the drive voltage to charge the bootstrap capacitor when the pre-charge loop is conducted in the reset phase, so that a voltage at the first terminal of the bootstrap capacitor is adjusted to reach a value of the drive voltage, a voltage at the second terminal of the bootstrap capacitor is reset to reach a value of the zero-potential voltage, and a difference between the voltage at the first terminal of the bootstrap capacitor and the voltage at the second terminal of the bootstrap capacitor reaches the value of the drive voltage;

a data-writing loop comprising the bootstrap capacitor, the drive transistor, and the energy-storage capacitor coupled in series, wherein the data-writing loop is configured to receive the data voltage at the second terminal of the bootstrap capacitor to charge the energy-storage capacitor based on a bootstrap effect of the bootstrap capacitor when the data-writing loop is conducted in the data-writing phase, so that a voltage at the control terminal of the drive transistor is adjusted from the value of the first reset-voltage to a value of a second voltage, and wherein the drive transistor is in a critical conduction state when the voltage at the control terminal of the drive transistor is equal to the second voltage, and the second voltage is equal to a sum of the drive voltage, the data voltage, and a threshold voltage of the drive transistor; and a light-emitting loop comprising the drive transistor and the light-emitting element coupled in series, wherein the first coupling terminal of the drive transistor is configured to receive the drive voltage to drive the light-emitting element to emit lights when the light-emitting loop is conducted in the light-emitting phase;

wherein in the light-emitting phase, a current between a source of the drive transistor and a drain of the drive transistor is equal to $(K/2)*(Vdata)^2$, wherein K=Cox×μ×W/L, Cox represents a gate capacitance per unit area of the drive transistor, u represents a migration rate of channel electron motion of the drive transistor, W/L represents a width-to-length ratio of a channel of the drive transistor, and Vdata represents the data voltage;

wherein the pre-charge loop comprises a first switching transistor, the bootstrap capacitor, and a second switching transistor coupled in series;

wherein the data-writing loop comprises a third switching transistor, the bootstrap capacitor, the drive transistor, a fourth switching transistor, and the energy-storage capacitor coupled in series;

wherein the light-emitting loop comprises the first switching transistor, the drive transistor, a fifth switching transistor, and the light-emitting element coupled in series;

wherein the energy-storage-capacitor reset loop comprises the energy-storage capacitor and a sixth switching transistor coupled in series;

wherein the pixel drive circuit further comprises a light-emitting-element reset loop, and the light-emitting-element reset loop comprises a seventh switching transistor and the light-emitting element coupled in series; and wherein a control terminal of the second switching transistor, a control terminal of the sixth switching transistor, and a control terminal of the seventh switching transistor are configured to receive a same scan signal during the reset phase, the data-writing phase, and the light-emitting phase within the one-frame display period.

10. The display panel of claim 9, wherein the first switching transistor has a first coupling terminal configured to receive the drive voltage and a second coupling terminal electrically coupled with the first terminal of the bootstrap capacitor;

the second switching transistor has a first coupling terminal electrically coupled with a grounding terminal and configured to receive the zero-potential voltage and a second coupling terminal electrically coupled with the second terminal of the bootstrap capacitor; and in the reset phase, the first switching transistor is configured to be conducted in response to a scan signal received at a control terminal of the first switching transistor, and the second switching transistor is configured to be conducted in response to a scan signal received at the control terminal of the second switching transistor, so that the pre-charge loop is conducted.

11. The display panel of claim 10, wherein the third switching transistor has a first coupling terminal configured to receive the data voltage and a second coupling terminal electrically coupled with the second terminal of the bootstrap capacitor;

the fourth switching transistor is electrically coupled between the second coupling terminal of the drive transistor and the first terminal of the energy-storage capacitor; and in the data-writing phase, the third switching transistor is configured to be conducted in response to a scan signal received at a control terminal of the third switching transistor, and the fourth switching transistor is configured to be conducted in response to a scan signal received at a control terminal of the fourth switching transistor, so that the data-writing loop is conducted.

12. The display panel of claim 11, wherein the first switching transistor has the second coupling terminal electrically coupled with the first coupling terminal of the drive transistor;

the fifth switching transistor is electrically coupled between the second coupling terminal of the drive transistor and the second terminal of the light-emitting element; and in the light-emitting phase, the first switching transistor is configured to be conducted in response to the scan signal received at the control terminal of the first switching transistor, and the fifth switching transistor is configured to be conducted in response to a scan signal received at a control terminal of the fifth switching transistor, so that the light-emitting loop is conducted.

13. The display panel of claim 12, wherein the sixth switching transistor has a first coupling terminal configured to receive the first reset-voltage and a second coupling terminal electrically coupled with the first terminal of the energy-storage capacitor; and in the reset phase, the sixth switching transistor is configured to be conducted in response to a scan signal received at the control terminal of the sixth switching transistor, so that the energy-storage-capacitor reset loop is conducted.

14. The display panel of claim 13, wherein the seventh switching transistor has a first coupling terminal configured to receive the second reset-voltage and a second coupling terminal electrically coupled with the second terminal of the light-emitting element; and in the reset phase, the seventh switching transistor is configured to be conducted in response to a scan signal received at the control terminal of the seventh switching transistor, so that the light-emitting-element reset loop is conducted, and a voltage at the second terminal of the light-emitting element is reset to reach a value of the second reset-voltage.

15. The display panel of claim 14, wherein the first switching transistor, the second switching transistor, the third switching transistor, the fourth switching transistor, the fifth switching transistor, the sixth switching transistor, the seventh switching transistor, and the drive transistor each are a low-level conduction transistor.

16. The display panel of claim 15, wherein the drive transistor is a Low Temperature Polysilicon Thin Film Transistor (LTPS TFT); and the first switching transistor, the second switching transistor, the third switching transistor, the fourth switching transistor, the fifth switching transistor, the sixth switching transistor, and the seventh switching transistor each are an Oxide Semiconductor Thin Film Transistor (Oxide TFT).

* * * * *